United States Patent [19]

Honma et al.

[11] 4,252,909
[45] Feb. 24, 1981

[54] FREE-EXPANDABLE RUBBERY COMPOSITION

[75] Inventors: Kiyoshi Honma, Ichihara; Hidekuni Oda, Iwakuni, both of Japan

[73] Assignee: Mitsui Petrochemical Industries, Ltd., Tokyo, Japan

[21] Appl. No.: 18,048

[22] Filed: Mar. 6, 1979

[30] Foreign Application Priority Data

Mar. 8, 1978 [JP] Japan .................. 53-2548978

[51] Int. Cl.³ .............................................. C08J 9/04
[52] U.S. Cl. .................................. 521/144; 521/84;
521/89; 521/96; 521/140; 521/150; 521/909;
521/910; 525/211; 525/240
[58] Field of Search .................. 521/144, 150

[56] References Cited

U.S. PATENT DOCUMENTS

| | | | |
|---|---|---|---|
| 3,282,864 | 11/1966 | Bost et al. | 521/144 |
| 3,428,583 | 2/1969 | Tasman | 521/144 |
| 3,580,867 | 5/1971 | Spenadel et al. | 521/144 |
| 3,616,365 | 10/1971 | Stastny et al. | 521/144 |
| 3,965,054 | 6/1976 | Nojiri et al. | 521/144 |
| 4,163,085 | 7/1979 | Kühnel | 521/144 |

FOREIGN PATENT DOCUMENTS

| | | |
|---|---|---|
| 2131544 | 6/1971 | Fed. Rep. of Germany . |
| 2238366 | 3/1974 | Fed. Rep. of Germany . |
| 4832961 | 9/1971 | Japan . |
| 2654177 | 7/1977 | Japan . |
| 1222860 | 2/1971 | United Kingdom . |
| 1443862 | 7/1976 | United Kingdom . |

*Primary Examiner*—Morton Foelak
*Attorney, Agent, or Firm*—Wenderoth, Lind & Ponack

[57] ABSTRACT

A free expandable rubbery composition comprising an ethylene/α-olefin copolymer or terpolymer, a blowing agent and a crosslinking agent, said ethylene/α-olefin co- or terpolymer simultaneously meeting the following requirements (A), (B) and (C):

(A) it contains 55 to 73 mole % of an ethylene unit,
(B) it has an (EB×TS) value of at least 7,000 wherein EB represents the break elongation (%) of the co- or terpolymer and TS is the maximum tensile strength (kg/cm²) of the co- or terpolymer, and
(C) it has a Mooney viscosity, $ML_{1+4}$ at 121° C., of 65 to 120.

This composition can be used for the production of a crosslinked and foamed rubbery article by the free expansion method.

16 Claims, 2 Drawing Figures

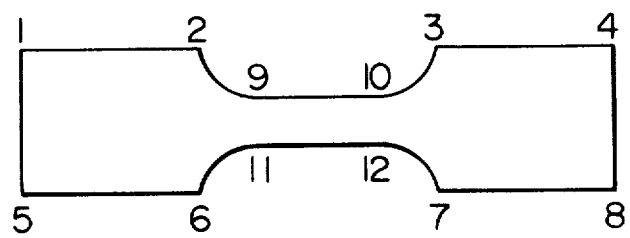
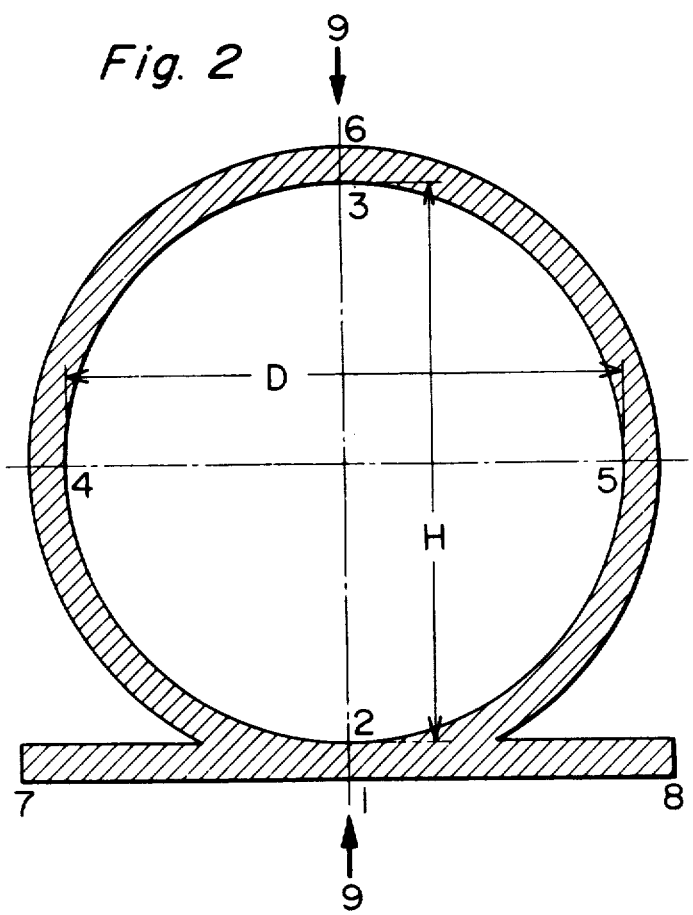

FREE-EXPANDABLE RUBBERY COMPOSITION

This invention relates to a novel free-expandable rubbery composition. More specifically, the invention relates to a rubbery composition based on a specified ethylene/α-olefin co- or terpolymer from which a crosslinked and foamed rubbery article can be manufactured by the free expansion method, to the use of the rubbery composition for the production of the crosslinked and foamed rubbery article, and to a process for producing the crosslinked and foamed rubbery article.

Crosslinked and foamed rubbery articles based on an ethylene/α-olefin co- or terpolymer have found a wide range of applications such as sealing materials for automobiles or building or construction because of their superior properties such as ozone resistance, heat resistance and weather resistance.

Foamed articles used in these applications are prepared usually by the following procedure. First, the polymer, a softener, a filler, and other optional additives are mixed by using a mixer such as a Banbury mixer (the mixture obtained in this step will be sometimes referred to as a compound A). The compound A is additionally mixed with a blowing agent or a crosslinking agent to form a crosslinkable and foamable composition (the resulting composition in this step will sometimes be referred to as a compound B). Since the crosslinking agent and blowing agent can be added to the compound A at a low temperature of 40° to 80° C. without inducing foaming or a reaction such as crosslinking, a roll processing method is generally used in preparing a crosslinkable and foamable rubber composition (compound B). The resulting compound B is then molded into the desired shape, sent to a vulcanization tank, and then crosslinked and foamed by heating to obtain the final product.

In order to perform the foaming and crosslinking step by a continuous process based on extrusion molding instead of a batchwise process based on injection molding, compound B must be able to be crosslinked and foamed by its free expansion. To achieve this, the composition and properties of the compound B must be strictly controlled. For this purpose various methods have been suggested in the past for rendering the compound B freely expandable.

For example, U.S. Pat. No. 3,580,867 discloses a process for producing a vulcanizable compounded EPDM suitable for use in producing sponge by the free expansion method, which comprises heat-treating an ethylene/propylene/diene monomer (EPDM) and a reinforcing black in the presence of a certain chemical promoter. The process disclosed in the U.S. Patent involves complicated process steps, and no attention is paid to the properties of EPDM used.

British Pat. No. 1,443,862 discloses a process for producing a foam rubber article by the free expansion method which comprises using a mixture containing an ethylene/propylene co- or terpolymer and 1 to 25% by weight of chloro or bromo butyl rubber. The British Patent, however, gives no specific disclosure about the type and properties of the ethylene/propylene co- or terpolymer used, and as will be described hereinbelow, depending upon the ethylene/propylene co- or terpolymer used, a satisfactory free-expandable composition may not be obtained.

Japanese Patent Publication No. 26541/77 suggests the use of a copolymer rubber (EPT) having a Mooney viscosity of 5 to 30 and derived from 25 to 85 mole% of ethylene, 15 to 75 mole% of an α-olefin and 0.05 to 10 mole% of a diolefin as a sponge rubber material. When only a small amount of a softening agent is added in the production of a crosslinked and foamed article from the EPDM by the free expansion method, no particular technical difficulty will arise in production, but because of using a great quantity of the relatively expensive copolymer rubber, the cost of the final foamed article obtained is relatively high. On the other hand, when the softener is used in a large amount, the green strengths of compounds A and B are reduced extremely, and therefore, the composition bags during roll processing and its banding about the rolls is poor. Furthermore, because the strength of the extrudate in the form of compound B is low, the extrudate will deform by its own weight before the completion of vulcanization and foaming at 180° to 260° C. in a vulcanization tunnel (the phenomenon is generally referred to as "collapsing"). This is a serious defect because a product of the intended shape cannot be obtained.

In an attempt to avoid these defects, the present inventors used an EPDM component containing at least 75 mole% of ethylene units to increase strength by the crystallinity of the ethylene chains. Certainly, this increases the strengths of compounds A and B at room temperature, but at the roll temperature during roll processing, the ethylene chains will be melted so that the banding of the compound about the rolls cannot be improved. The defect of collapsing at the time of vulcanization and foaming can be remedied to some extent, but it is still insufficient. Furthermore, since such an EPDM has lowered flowability when exposed to low temperatures in the wintertime, a great load is exerted on the mixer in the step of producing compound A, and extra energy will be needed which is otherwise unnecessary. Furthermore, the compound A has unsatisfactory processing characteristics, such as poor feedability to the rolls, during roll processing. Moreover, the foamed articles so produced lack flexibility in the wintertime, and have unsatisfactory performance as a sealing material.

The inventors also attempted to use an ethylene/propylene terpolymer (EPT rubber) having a high molecular weight or a high Mooney viscosity. In this case, the green strength of the compound B increases, but to obtain compound B having resistance to collapsing in the vulcanizing and foaming step, the EPT rubber should have a very high Mooney viscosity. Such an EPT rubber having a high Mooney viscosity has low flowability at all times, and energy is wasted in the step of obtaining compound A. Moreover, the resulting compound A has low flowability. The compound A has reduced processing characteristics such as poor feedability to rolls. It is of course possible to improve the feedability of the compound A to the rolls by increasing the amount of the softener used. However, this results in the reduced green strength of the compounds A and B, and roll banding is poor. Moreover, collapsing occurs at the time of vulcanization and foaming, and the strength of the resulting foamed article is weak. In any case, when a relatively large amount of a softener is used as a foaming material, the use of EPDM conventionally used to provide foamed articles of this kind cannot give a crosslinkable and foamable rubbery composition which can be processed by the free expansion method and which has a well balanced combination of processability, freedom from collapsing and the properties of foamed articles, even if the amount of the filler and other additives are varied suitably.

It is an object of this invention to provide a crosslinkable and foamable composition based on an ethylene/α-olefin co- or terpolymer (to be referred to sometimes as "EO polymer") which can be processed by the free expansion method, and which is free from the disadvantages described hereinabove.

Another object of this invention is to provide a rubbery composition based on an ethylene/α-olefin co- or terpolymer which can be molded by the free expansion method into a crosslinked and foamed rubbery article having superior properties without any processing difficulties and collapsing at the time of crosslinking and foaming.

It is still another object of this invention to provide use of such a crosslinkable and foamable rubbery composition in the production of crosslinked and foamed rubbery articles by the free expansion method.

A further object for this invention is to provide a process for producing a crosslinked and foamed rubbery article having superior properties by the free expansion method without any processing difficulties and collapsing at the time of crosslinking and foaming, which involves using a specified ethylene/α-olefin co- or terpolymer.

Other objects and advantages of this invention will become apparent from the following description.

According to this invention, there is provided a free-expandable rubbery composition comprising an ethylene/α-olefin co- or terpolymer, a blowing agent and a crosslinking agent, said ethylene/α-olefin co- or terpolymer concurrently meeting the following requirements, (A) it contains 55 to 73 mole% of an ethylene unit,
(B) it has an (EB×TS) value of at least 7,000 wherein EB represents the break elongation (%) of the co- or terpolymer and TS represents the maximum tensile strength (kg/cm$^2$) of the co- or terpolymer, and
(C) it has a Mooney viscosity (ML$_{1+4}$, 121° C.) of 65 to 120.

It has been found that the use of the ethylene/α-olefin co- or terpolymer meeting the specified requirements described above can give a crosslinked and foamed rubber article which has a sufficient practical strength and low temperature flexibility and is very suitable as a sealing material. In the preparation of compound A from the co- or terpolymer in a mixer, the load on the mixer is small, and feedability of the stock to rolls and its banding about the rolls are good at the time of roll processing. In addition, collapsing at the time of foaming is reduced.

It has also been found that the ethylene/α-olefin co- or terpolymer used to produce the free-expandable rubbery composition should simultaneously meet the requirements (A), (B) and (C) described above. When an EO polymer which fails to satisfy any one of these requirements is used, the processing requirements in the preparation of the crosslinked and foamed rubbery article, and the requirement for the quality of the foamed article cannot be met. For example, when an EO polymer having an ethylene unit content of more than 73 mole% [outside the requirement (A)] but meeting the requirements (B) and (C) is used, the composition loses flowability in the wintertime and has poor processability. In addition, a foamed article obtained from such a composition loses low temperature flexibility. When an EO polymer having an ethylene content of less than 55 mole % is used, the resulting foamed article tends to lack strength. Generally, a foamed article for use as a sealing material should desirably have a tensile strength of at least 20 kg/cm$^2$, but the tensile strength of the foamed article obtained by using the EO polymer having an ethylene unit content of less than 55 mole% is less than 20 kg/cm$^2$.

The EO polymer used in this invention may contain 55 to 73 mole%, preferably 58 to 71 mole%, more preferably 60 to 70 mole% of an ethylene unit.

If the EO polymer used in this invention fails to meet the requirement (B), namely has an (EB×TS) [i.e., the product of the maximum tensile strength (TS, kg/cm$^2$) and the break elongation (EB, %)] of less than 7,000, compounds A and B obtained by banding the EO polymer with a softener have lowered green strengths. Hence, there is a greater tendency toward the reduced roll banding property in the roll processing step and toward the occurrence of collapsing in the crosslinking and foaming step. The present inventors have found that in order to secure good roll banding property, the desirable green strength of compound A should generally be at least 10 kg/cm$^2$, and that to reduce collapsing in the crosslinking and foaming step, the green strength of compound B should desirably be at least 10 kg/cm$^2$. However, if EO polymer having an (EB×TS) value of less than 7,000 is used, even when the EO polymer is loaded with 30 to 150 parts by weight, per 100 parts by weight of the EO polymer, of a softener, compounds A and B have a green strength of less than 10 kg/cm$^2$.

Accordingly, the EO polymer of this invention should have an (EB×TS) value of at least 7,000, preferably 10,000 to 100,000, more preferably 10,000 to 50,000.

The "maximum tensile strength (TS)", used in the present application, denotes the maximum tensile stress measured at 25° C. at a tensile speed of 500 mm/min. in accordance with JIS K6301 using a 1 mm-thick dumbbell-shaped specimen whose front elevation is shown in FIG. 1 of the accompanying drawings. The specimen used in this test is prepared by allowing about 10 g of an EO polymer containing no additive to stand in a hot press at 160° C. for 10 minutes under a pressure of 50 kg/cm$^2$, immediately then dipping it in a large quantity of water at 20° C., allowing it to stand in the water for 10 minutes, withdrawing it from the water, allowing it to stand for 1 hour in an atmosphere at 25° C., and punching out the dumbbell-type specimen shown in FIG. 1 from the resulting 1.0 mm-thick sheet.

In FIG. 1 showing the dumbbell-type specimen, the distance between 1 and 4 (or between 5 and 8) is 50 mm; the distance between 1 and 5 (or between 4 and 8) is 12 mm; the distance between 9 and 10 (or between 11 and 12) is 10 mm; the distance between 9 and 11 (or between 10 and 12) is 4 mm; and the curve connecting 2 and 9 (or 3 and 10, 6 and 11, or 7 and 12) is an arc with a radius of 6 mm.

The maximum tensile strength (TS) of the EO polymer used in this invention can be varied freely so long as the EB×TS value is within the above-specified range. Advantageously, however, the maximum tensile strength is generally not more than 100 kg/cm$^2$, preferably 5 to 60 kg/cm$^2$, more preferably 10 to 50 kg/cm$^2$.

The "break elongation (EB)", as used in the present application, is measured as follows: Parallel indicator lines with a clearance of 10 mm therebetween are drawn from 9 to 11 and from 10 to 12, respectively in the specimen shown in FIG. 1, and the specimen is pulled by the same method as in the measurement of the maximum tensile strength. Let the maximum length between the indicator lines at the point of breakage of the test specimen be L (mm), then the elongation (%) at break is calculated from the following equation.

$$EB = \frac{L - 10}{10} \times 100$$

The elongation at break (EB) of the EO polymer used in this invention can also be varied widely so long as the EB×TS value is within the above-specified range. The suitable elongation at break of the EO polymer in this invention is generally at least 500%, preferably not less than 800%, more preferably not less than 1000%.

The EO polymer used in this invention should also meet the requirement (C), namely have a Mooney viscosity ($ML_{1+4}$, 121° C.) of 65 to 120. When the EO polymer has a Mooney viscosity of more than 120, the EO polymer and compound A obtained from the polymer have reduced flowability. Consequently, there are great losses of energy in the step of preparing compound A, and the feedability of the compound A to the rolls is aggravated. On the other hand, when the EO polymer has a Mooney viscosity of less than 65, the resulting foamed article has too low a tensile strength to be practical.

Thus, the EO polymer used in this invention may have a Mooney viscosity ($ML_{1+4}$, 121° C.) of preferably 70 to 120, more preferably 70 to 110.

The EO polymer which meets the requirements (A), (B) and (C) used in accordance with this invention can be prepared by copolymerizing ethylene and an α-olefin with or without a diolefin as an optional ingredient.

For example, the EO polymer in accordance with this invention is prepared by polymerizing in one or more steps ethylene and an α-olefin and optionally a diolefin in a hydrocarbon solvent such as hexane, heptane, octane, cyclohexane, benzene, toluene, xylene, kerosene and mixtures thereof in the presence of a specified catalyst at a temperature of from about 40° C. to about 100° C. The catalyst used is a mixed catalyst composed of (a) a vanadium compound of the formula $$VO(OR^1)_n X_{3-n}{}^1 \qquad (I)$$

wherein $R^1$ represents an aliphatic hydrocarbon group such as methyl, ethyl, propyl, iso-propyl, n-butyl, iso-butyl, sec-butyl and amyl, $X^1$ represents a halogen atom, and n is a positive number of 3 or less, and (b) an organoaluminum compound of the formula $$R_m{}^2 AlX_{3-m}{}^2 \qquad (II)$$

wherein $R^2$ is a hydrocarbon group such as ethyl, propyl, iso-propyl, iso-butyl, sec-butyl, and amyl, $X_2$ is a halogen atom, and m is a number larger than 1 but smaller than 1.5, the mole ratio of the organoaluminum compound (b) to the vanadium compound (a) being not less than 5, preferably 5 to 8. Specific operating conditions employed in this polymerization process are illustrated in The Reference Example to be given hereinbelow.

The proportions of ethylene, α-olefin and diolefin charged at this time can be properly adjusted according to the required contents of an ethylene unit, and α-olefin unit and a diolefin unit in the resulting EO polymer. The molecular weight of the EO polymer can be controlled by performing the above polymerization in the further presence of hydrogen gas.

The α-olefin is a linear or branched unsaturated aliphatic hydrocarbon having one ethylenic double bond at the α-position. Suitable α-olefins contain up to 10 carbon atoms, preferably 3 to 8 carbon atoms, more preferably 3 to 4 carbon atoms. Examples are propylene, butene-1, pentene-1, hexane-1, 4-methyl-pentene-1 and octene-1. Among these, propylene and butene-1 are preferred, and propylene is most preferred. These α-olefins can be used singly, but if desired, as a mixture of two or more of them.

The EO polymer used in this invention may be a copolymer of ethylene and the α-olefin, or a terpolymer of ethylene, the α-olefin and the diolefin.

The diolefin used to form the terpolymer is a linear or branched unsaturated aliphatic or alicyclic hydrocarbon containing two ethylenic double bonds in the molecular chain, and suitable diolefins have up to 20 carbon atoms, preferably 4 to 15 carbon atoms, more preferably 6 to 12 carbon atoms. Examples include isoprene, butadiene, 1,4-pentadiene, 1,4-hexadiene, divinylbenzene, dicyclopentadiene, methylene norbornene, and ethylidene norbornene. Dicyclopentadiene, 1,4-hexadiene and ethylidene norbornene are preferred, and ethylidene norbornene is most preferred. These diolefins can be used either singly or as a mixture of two or more.

When the EO polymer is a copolymer of ethylene and α-olefin, the content of the α-olefin unit may be 27 to 45 mole%, preferably 29 to 42 mole%, more preferably 30 to 40 mole%. In the case of a terpolymer of ethylene, α-olefin and diolefin, the balance of the terpolymer resulting from excluding the ethylene unit and the diolefin unit preferably consists of the α-olefin unit. The content of the α-olefin unit in the terpolymer may be 17 to 45 mole%, preferably 20 to 45 mole%, more preferably 20 to 40 mole%. The content of the diolefin unit is at most 10 mole%, preferably 0.5 to 10 mole%, more preferably 1.0 to 5 mole%. In terms of iodine value, the diolefin unit content is at most 80, preferably 4 to 75, more preferably 8 to 40.

The ethylene/α-olefin/diolefin terpolymer is preferred to the ethylene/α-olefin copolymer as the EO polymer used in this invention.

An EO polymer most suitable for the objects of this invention is a terpolymer of 55 to 73 mole% of an ethylene unit and the remainder consisting essentially of a propylene unit and an ethylidene norbornene unit which has an iodine value of 8 to 40, an EB×TS value of 10,000 to 100,000, a TS value of 5 to 60 kg/cm², an EB value of at least 1,000%, and a Mooney viscosity ($ML_{1+4}$, 121° C.) of 65 to 110.

A free-expandable rubbery composition can be formed by compounding the EO polymer with a blowing agent and a crosslinking agent in a manner known per se. The content of the EO polymer at this time is not critical, and can be varied widely according to the end use of the final foamed article, etc. However, advantageously, it is generally 20 to 65% by weight, preferably 25 to 55% by weight, more preferably 30 to 50% by weight, based on the weight of the rubbery composition obtained.

Blowing agents which generate gases in an amount of 80 ml/g of blowing agent upon decomposition are used. Such blowing agents have a decomposition temperature of 100° to 250° C., preferably 110° to 230° C., more preferably 120° to 210° C. Moreover, such blowing agents should not hamper the crosslinking of the EO polymer. Examples of such blowing agents include inorganic blowing agents such as sodium bicarbonate, sodium carbonate, ammonium bicarbonate, ammonium carbonate and ammonium sulfite; nitro compounds such as N,N'-dimethyl-N,N'-nitroso-terephthalamide and N,N'-dinitroso-pentamethylenetetramine; azo compounds such as azodicarbonamide, azobisisobutyronitrile, azocyclohexylnitrile, azodiaminobenzene and barium-azodicarboxylate; sulfonyl hydrazide compounds such as benzenesulfonyl hydrazide, toluenesulfonyl hydrazide, p,p'-hydroxybis-(benzenesulfonyl hydrazide), and diphenylsulfone-3,3'-disulfonyl hydrazide; and azide compounds such as calcium azide, 4,4'-diphenyldisulfonyl azide, and p-toluenesulfonyl azide. Among these, N,N-dinitroso-pentamethylenetetramine, azodicarbonamide, toluenesulfonyl hydrazide, and p,p'-hydroxybis(benzenesulfonyl hydrazide) are preferred. These blowing agents can be used either singly or as a mixture of two or more of these.

The amount of the blowing agent is not critical, and can be varied widely according to the desired apparent density of the final foamed article. It may be generally 0.5 to 50 parts by weight, preferably 0.5 to 30 parts by weight, more preferably 1 to 15 parts by weight, per 100 parts by weight of the EO polymer in the composition.

If required, a blowing promoter may be used together with the blowing agent. The blowing promoter is an additive used to lower the decomposition temperature of the blowing agent, and/or promote its decomposition, and/or to make the resulting cells uniform. Examples of such a blowing promoter are such organic acids as salicyclic acid, phthalic acid, and stearic acid, and urea and its derivatives. Usually, the blowing promoter may be used in an amount of 2 to 50 parts by weight, preferably 3 to 30 parts by weight, per 100 parts by weight of the blowing agent.

The crosslinking agent may be any compound which is normally used for the crosslinking of the EO polymer, and which permit the crosslinking reaction to proceed at the curing temperature and within the curing time described hereinbelow.

Examples of such crosslinking agents include sulfur; sulfur compounds such as sulfur chloride, sulfur dichloride, morpholine disulfide, alkylphenol disulfides, tetramethylthiuram disulfide and selenium dimethyldithiocarbamate; and organic peroxides such as dicumyl peroxide, 2,5-dimethyl-2,5-di(tert.butyl peroxy)hexane, 2,5-dimethyl-2,5-di(benzoylperoxy)hexane, 2,5-dimethyl-2,5-di(tert.butyl peroxy)hexane-3, di-tert.butyl peroxide, di-tert.butyl peroxy-3,3,5-trimethylcyclohexane and tert.butyl hydroperoxide.

When the ethylene/α-olefin copolymer is used as the EO polymer, the organic peroxides are suitable as the crosslinking agent. Among these, dicumyl peroxide, di-tert.butyl peroxide, and di-tert.butyl peroxy-3,3,5-trimethylcyclohexane are preferred. When the ethylene/α-olefin/diene terpolymer is used as the EO polymer, any of the above-exemplified crosslinking agent can be used. Of these, sulfur, dicumyl peroxide, di-tert.butyl peroxide, and di-tert.butyl peroxy-3,3,5-trimethylcyclohexane are preferred, and sulfur is most preferred.

The amount of the crosslinking agent is not critical, and can be varied widely according to the degree of crosslinking desired of the final foamed article. Generally, it may be 0.1 to 15 parts by weight, preferably 0.3 to 10 parts by weight, per 100 parts by weight of the EO polymer. More specifically, sulfur and the sulfur compounds are used in an amount of preferably 0.1 to 10 parts by weight, more preferably 0.5 to 5 parts by weight, per 100 parts by weight of the EO polymer. The organic peroxides may be added in an amount of preferably 0.1 to 15 parts by weight, more preferably 0.5 to 8 parts by weight, per 100 parts by weight of the EO polymer.

When sulfur or the sulfur compound (vulcanizer) is used as the crosslinking agent, they may, as required, be used in combination with a vulcanization accelerator and/or a vulcanization activator. Examples of suitable vulcanization accelerators include thiazole compounds such as N-cyclohexyl-2-benzothiazole-sulfenamide, N-oxydiethylene-2-benzothiazole-sulfenamide, N,N-diisopropyl-2-benzothiazole sulfenamide, 2-mercaptobenzothiazole, 2-(2,4-dinitrophenyl)-mercaptobenzothiazole, 2-(2,6-diethyl-4-morpholinothio)-benzothiazole and dibenzothiazyl disulfide; guanidines such as diphenylguanidine, triphenylguanidine, di-ortho-tolylguanidine, ortho-tolyl-biguanide and diphenylguanidine phthalate; aldehyde/amine or aldehyde/ammonia compounds such as an acetaldehyde/aniline reaction product, a butyraldehyde/aniline condensate, and an acetaldehyde/ammonia reaction product; imidazoline compounds such as 2-mercaptoimidazoline; thiourea compounds such as thiocarbanilide, diethylthiourea, dibutylthiourea, trimethylthiourea and di-ortho-tolylthiourea; thiuram compounds such as tetramethylthiuram monosulfide, tetramethylthiuram disulfide, tetraethylthiuram disulfide, tetrabutylthiuram disulfide, and pentamethylenethiuram tetrasulfide; dithioacid salts such as zinc dimethyldithiocarbamate, zinc diethylthiocarbamate, zinc di-n-butyldithiocarbmate, zinc ethylphenyldithiocarbamate, zinc butylphenyldithiocarbamate, sodium dimethyldithiocarbmate, selenium dimethyldithiocarbamate and tellurium diethyldithiocarbamate; xanthate compounds such as zinc dibutylzanthogenate; and hexamethylenetetramine. The amount of the vulcanization accelerator is generally 0.1 to 20 parts by weight, preferably 0.2 to 10 parts by weight, per 100 parts by weight of the EO polymer.

Suitable vulcanization activators include metal compounds such as magnesium oxide and zinc oxide, the latter being especially suitable. The amount of the vulcanization activator is generally 3 to 20 parts by weight, preferably 3 to 15 parts by weight, per 100 parts by weight of the EO polymer.

When an organic peroxide is used as the crosslinking agent, a crosslinking co-agent may be used together, as required. Examples of such crosslinking co-agents are sulfur; quinone dioxime compounds such as p-quinone dioxime; methacrylate compounds such as polyethylene glycol dimethacrylate; allyl compounds such as triallyl cyanurate; maleimide compounds; and divinylbenzene. The amount of the vulcanization co-agent is usually 0.1 to 20 parts by weight, preferably 0.3 to 15 parts by weight, per 100 parts by weight of the EO polymer.

Preferably, the free-expandable rubbery composition of this invention may contain a softener and/or a filler.

The softener is added generally for the purpose of (1) imparting flexibility to the foamed article, (2) reducing the viscosity of compound A or B to ensure easy dispersion of the individual ingredients at the time of compounding, and (3) for making it easy to extrude compound B. In the present invention, softeners normally used in rubber can be equally employed in this invention. Examples of the softeners include petroleum softeners such as process oils, lubricant oils, paraffin, liquid paraffin, petroleum asphalt and vaseline; coal tar-type softeners such as coal tar and coal tar pitch; vegetable oils such as castor oil, linseed oil, colza oil, coconut oil, Turkey red oil and tall oil; Factice; waxes such as beeswax, carnauba wax and lanolin; fatty acids and fatty acid salts such as linoleic acid, palmitic acid, barium stearate, calcium stearate and zinc laurate; and synthetic polymeric materials such as petroleum resins, atactic polypropylene and coumaron-indene resin. These softeners can be used either singly or as a mixture of two or more of these.

Among these softeners, the petroleum softeners are preferred, and process oils are especially preferred.

The amount of the softener is not critical, and can be varied over a wide range. Generally, it is at least 10 parts by weight, preferably 30 to 150 parts by weight, more preferably 40 to 120 parts by weight, per 100 parts by weight of the EO polymer. If it is used in too large an amount, compounds A and B have reduced green strengths, and disadvantages in processing and quality may be caused. For example, the roll banding is aggravated, collapsing occurs, and the final foamed article has a reduced strength.

Examples of the filler that can be incorporated into the composition as desired include carbon blacks normally used in rubbers such as SRF, GPF, FEF, HAF, ISAF, SAF, FT and MT, and inorganic fillers such as finely divided silica, calcium carbonate, talc and clay. These fillers may be used singly or as a mixture of two or more of these. Desirably, the filler is used in the form of a powder having a minimum particle size. Generally, fillers having an average particle diameter of less than 2 microns, preferably less than 1 micron, are advantageously used.

The amount of the filler is not critical, and can be varied widely. It may be usually 30 to 400 parts by weight, preferably 50 to 350 parts by weight, per 100 parts by weight of the EO polymer.

The composition of this invention may further contain an antioxidant such as naphthylamines, diphenylamines, p-phenylenediamines, quinolines, hydroquinone derivatives, monophenols, bis-, tris- or polyphenols, thiobisphenols, and waxes; a tackifier such as coumarone resins, phenol and terpene resins, petroleum hydrocarbon resins, rosin derivatives and other additives generally used in compositions of this kind in the amounts generally employed.

The composition of this invention may, as required, further contain up to 40 parts by weight, per 100 parts by weight of the EO polymer, of another rubber-like polymer such as natural rubber, butadiene rubber, styrene/butadiene copolymer rubber, butyl rubber, chloroprene rubber, chlorinated polyethylene, and chlorosulfonated polyethylene.

The free-expandable rubbery composition can be prepared by compounding the components described above by a known method. For example, the composition of this invention (compound B) can be prepared by mixing the EO polymer with a softener and a filler in the aforesaid proportions, mixing them intimately using a mixer such as a Banbury mixer to form compound A, mixing the compound A with a blowing agent, a crosslinking agent and other components, and kneading them fully by an open roll or the like.

The composition of this invention so prepared can be used to produce a crosslinked and foamed rubbery article. In particular, the composition of this invention is suitable for the production of a crosslinked and foamed rubbery article by the free expansion method.

A foamed and crosslinked article can be prepared from the composition of this invention by the free expansion method, preferably continuously, by processing the composition into the desired shape by a processing machine such as an extruder, and heating the processed article in a heating device such as a hot air oven, an infrared furnace, a fluidized bed, a salt bath or a microwave oven to perform its foaming and crosslinking. Suitable heating temperatures are generally from about 120° to about 300° C., preferably from about 150° to about 260° C. The foaming and crosslinking at these temperatures can be completed within about 1 to 30 minutes.

Desirably, the types and amounts of the EO polymer, a blowing agent, a crosslinking agent and other additives should be controlled so that the green strengths of the compounds A and B may be at least 10 kg/cm$^2$, preferably 10 to 40 kg/cm$^2$ to obtain good processing characteristics such as roll feedability and roll banding and good quality of the foamed articles such as the freedom from collapsing.

The foamed article produced from the composition of this invention by the aforesaid method is free from collapsing, and has superior properties such as flexibility, especially at low temperatures, tensile strength, and rubber-like properties such as low permanent compression strain and low hysteresis loss. It can be used widely in such fields as a sealing material in vehicles and building and construction applications, a heat insulating material and a cushioning material.

The use of the composition of this invention makes it possible to produce quantities of foamed articles, useful as high-performance sealing materials having such superior quality, by the free expansion method easily, stably and at low cost, and contributes greatly to the industry.

The following Examples further illustrate the present invention.

REFERENCE EXAMPLE

Production of ethylene/propylene/ethylidene norbornene terpolymer

Using a 15-liter stainless steel polymerization vessel equipped with stirring blades, ethylene, propylene and ethylidene norbornene were polymerized continuously by the following procedure.

From the top of the polymerization vessel, hexane as a polymerization solvent was fed continuously at a rate of 5 liters/hour. In the meantime, the polymerization mixture was continuously withdrawn from the bottom of the polymerization vessel so that the amount of the polymerization mixture within the polyermization vessel was always maintained at 5 liters.

As a catalyst, (A) the reaction product between vanadium oxytrichloride and ethyl alcohol (prepared in situ in a catalyst preparing vessel so that the mole ratio of vanadium oxytrichloride to ethyl alcohol became 1:1) was continuously fed into the polymerization vessel from its top so that the vanadium atom concentration in the vessel was maintained at 1 millimole/liter. Furthermore, as a catalyst, (B) a mixture of ethylaluminum sesquichloride [$(C_2H_5)_{1.5}AlCl_{1.5}$] and ethylaluminum dichloride [$(C_2H_5)AlCl_2$] (prepared so that the mole ratio of ethylaluminum sesquichloride to ethylaluminum dichloride became 3:7) was fed into the polymerization vessel from its top so that the concentration of aluminum atoms in the vessel was maintained at 6 millimoles/liter.

From the top of the polymerization vessel, a gaseous mixture of ethylene and propylene (ethylene 20 to 50 mole%, propylene 50 to 80 mole%) was fed at a rate of 600 liters/hour, and as a molecular weight controlling agent, hydrogen gas was fed at a rate of 0.02 to 0.5 liter/hour. Ethylidene norbornene was continuously fed from the top of the polymerization vessel at a rate of 10 to 30 g/hour.

The copolymerization reaction was performed at a temperature of about 70° C. by circulating hot water through a jacket fitted externally to the polymerization vessel. At this time, the pressure within the polymerization vessel was maintained at about 6–10 kg/cm$^2$ (gauge).

When the copolymerization reaction was performed under the conditions described above, a terpolymer of ethylene/propylene/ethylidene norbornene (to be abbreviated as EPEN) was obtained as a uniform solution. A small amount of methanol was added to the polymerization mixture withdrawn from the bottom of the polymerization vessel to stop the polymerization reaction. The polymer was taken out be steam stripping, and dried under reduced pressure at 80° C. for a day and a night.

Thus, EPEN was obtained at a rate of about 100–300 g/hour. The properties of the resulting EPEN are shown in Table 1, (A) and (B) (except Comparative Examples 5 and 6). The ethylene unit content of EPEN was determined by an infrared spectrum analysis.

EXAMPLES 1 to 5 and COMPARATIVE EXAMPLES 1 to 7

EPEN produced in Reference Example, process oil, zinc oxide, stearic acid and SRF carbon black were mixed and masticated for 6 minutes in a 4.2 liter Banbury mixer (Model OOC, a product of Kobe Steel-Making Co., Ltd.) to form compound A. The compound A was divided into two portions which were allowed to stand for one day in an atmosphere kept at 30° C. and 5° C., respectively.

Each of the two portions of compound A was blended with sulfur and each of the vulcanization accelerators and blowing agents shown in Table 2 in the amounts shown in Table 2, and masticated with an open roll (8 × 20 inches) at a roll temperature of 40° C. for 15 minutes to form compound B. The states of feeding and banding of compound A to the rolls were observed, and the results are shown in Table 1, (A) and (B).

The compound B was fed into a 60-mm diameter extruder having a die and barrel temperature of 60° C. and a screw temperature of 40° C., and then continuously sent to a hot air tunnel kept at 220° C., to heat it for 5 minutes and induce crosslinking and foaming to form a foamed article having the configuration shown in FIG. 2 of the accompanying drawings.

The tubular portion of the foamed article had a thickness (the distance between 1 and 2 or between 3 and 6) of 2 mm, and its inside diameter (the distance between 2 and 3, or between 4 and 5) was about 16 mm when no collapsing occurred. The distance between 7 and 8 was 20 mm.

The apparent density of the foamed article was measured by a method set forth in the method of physical testing of expanded rubbers of the Standards of Japan Association of Rubber Industry (Journal of the Society of Rubber Industry, JAPAN, vol. 41, No. 11, 92–96 (1968)).

A No. 3 dumbbell-type test specimen was punched out from the resulting foamed article. Using the test specimen, the tensile stress at break was measured by the method of JIS K6301 at a tensile speed of 500 mm/min, and made the tensile strength. The distance D between 4 and 5 and the distance H between 2 and 3 of the foamed article as shown in FIG. 2 were measured, and the shape retention ratio (D/H × 100, %) was calculated and made a measure for collapsing.

The other portion of compound B was similarly processed with an extruder, subsequently heated continuously in a hot air tunnel while blowing air into the interior of the processed article so as to avoid collapsing at the time of crosslinking and foaming, thereby to obtain a foamed article having almost the same D and H values. A sample having a length of 10 mm was prepared from the foamed article. In accordance with the method of ASTM D1056, the sample was compressed in the direction of arrow 9 in FIG. 2 at a deflecting speed of 2.5 mm/min, and the 25% compression deflection load was measured in an atmosphere kept at 25° C. and −40° C., respectively. Let the load at 25° C. be $F_{25}$ and the load at −40° C. be $F_{-40}$, a value of $F_{-40}/F_{25} \times 100$ was used as a measure for low-temperature flexibility.

The green strengths of the compounds A and B were measured in the following manner.

About 100 g of the compound A or compound B prepared in the above-described manner was re-masticated by an open roll (8 × 20 inches) at a roll temperature of 25° to 50° C., so that the temperature of the masticated mixture was 45° to 50° C. It was then formed into a 3 mm-thick sheet, and allowed to cool for 30 minutes in an atmosphere kept at 25° C.

A part of this sheet was allowed to stand in a hot press at 50° C. and 50 kg/cm$^2$ for 10 minutes to prepare a sheet (100 mm × 120 mm × 2.5 mm).

The sheet obtained by the above procedure was allowed to stand at 25° C. for 2 hours. A JIS No. 3 dumbbell-type test specimen was punched out from the sheet in a direction parallel to the grain direction of the compound, and its maximum tensile strength was measured at 25° C. at a pulling speed of 500 mm/min. by the method stipulated in JIS K6301. The maximum tensile strength so measured was made the green strength of the sheet.

TABLE 1 (A)

| Example | 1 | 2 | 3 | 4 | 5 |
|---|---|---|---|---|---|
| Properties of EPEN | | | | | |
| Ethylene content (moles %) | 60 | 66 | 69 | 65 | 68 |
| Iodine value | 24 | 24 | 24 | 24 | 24 |
| TS (kg/cm$^2$) | 10 | 10 | 12 | 20 | 30 |
| EB (%) | 1000 | 1800 | 2100 | 2060 | 3000 |
| TS × EB | 10 × 10$^3$ | 18 × 10$^3$ | 25.2 × 10$^3$ | 41.2 × 10$^3$ | 90 × 10$^3$ |

TABLE 1 (A)-continued

| Example | 1 | 2 | 3 | 4 | 5 |
|---|---|---|---|---|---|
| Mooney viscosity ($ML_{1+4}$, 121° C.) | 68 | 75 | 88 | 102 | 70 |
| Properties of compound A | | | | | |
| Green strength (kg/cm$^2$) | 12 | 16 | 21 | 28 | 38 |
| Feedability to rolls (5° C.) | Good | Good | Good | Good | Good |
| Feedability to rolls (30° C.) | Good | Good | Good | Good | Good |
| Roll banding | Good | Good | Good | Good | Good |
| Properties of compound B | | | | | |
| Green strength (kg/cm$^2$) | 12 | 16 | 20 | 26 | 35 |
| Properties of the foamed article | | | | | |
| Apparent density (g/ml) | 0.50 | 0.53 | 0.54 | 0.55 | 0.52 |
| Tensile strength (kg/cm$^2$) | 22 | 25 | 30 | 35 | 26 |
| Shape retention ratio (%) | 74 | 78 | 80 | 85 | 85 |
| $(F_{-40}/F_{25}) \times 100$ | 1.9 | 2.1 | 2.3 | 2.0 | 2.2 |

TABLE 1 (B)

| Comparative Example | 1 | 2 | 3 | 4 | 5(a) | 6(c) | 7 |
|---|---|---|---|---|---|---|---|
| Properties of EPEN | | | | | | | |
| Ethylene content (mole %) | 53 | 79 | 60 | 62 | 63 | 63 | 51 |
| Iodine value | 24 | 24 | 24 | 24 | (b) | 24(d) | 24 |
| TS (kg/cm$^2$) | 10 | 35 | 15 | 8 | 7 | 7 | 8 |
| EB (%) | 1950 | 800 | 1000 | 2600 | 300 | 290 | 1500 |
| EB × TS | 19.5 × 10$^3$ | 28 × 10$^3$ | 15 × 10$^3$ | 20.8 × 10$^3$ | 2.1 × 10$^3$ | 2.0 × 10$^3$ | 12 × 10$^3$ |
| Mooney viscosity ($ML_{1+4}$, 121° C.) | 70 | 70 | 130 | 55 | 63 | 67 | 67 |
| Properties of compound A | | | | | | | |
| Green strength (kg/cm$^2$) | 20 | 30 | 15 | 21 | 5 | 3 | 13 |
| Feedability to rolls (5° C.) | Good | Poor | Poor | Good | Good | Good | Good |
| Feedability to rolls (30° C.) | Good | Good | Poor | Good | Good | Good | Good |
| Roll banding | Good | Poor | Poor | Good | Poor | Poor | Good |
| Green strength (kg/cm$^2$) of compound B | 20 | 29 | 15 | 20 | 5 | 3 | 13 |
| Properties of the foamed article | | | | | | | |
| Apparent density (g/ml) | 0.50 | 0.52 | 0.60 | 0.50 | 0.55 | 0.56 | 0.50 |
| Tensile strength (kg/cm$^2$) | 18 | 32 | 40 | 16 | 24 | 27 | 15 |
| Shape retention ratio (%) | 71 | 70 | 85 | 70 | 58 | 61 | 70 |
| $(F_{-40}/F_{25}) \times 100$ | 1.7 | 5.0 | 1.9 | 2.1 | 1.9 | 2.0 | 1.6 |

(a):ENJAY 3509 (made by Enjay Chemical Company) was used as EPEN.
(b):Containing 2.6% by weight of unsaturation.
(c):BUNA AP 451 (made by CHEMISCHE WERKE HULS AG)
(d):The diene component was ethylene norbornene.

TABLE 2

| Ingredients | Amounts (parts by weight) |
|---|---|
| EPEN | 100 |
| Process oil (*1) | 60 |
| SRF carbon black (*2) | 100 |
| Sulfur | 2 |
| Vulcanization accelerators | |
| M (*3) | 1.5 |
| TT (*4) | 0.8 |
| TRA (*5) | 0.8 |
| TL (*6) | 0.8 |
| Foaming agent (*7) | 3 |
| Zinc oxide | 5 |
| Stearic acid | 2 |

(*1):Sonic P200 (a trademark, a product of Kyodo Sekiyu K.K.)
(*2):Seast S (a trademark, a product of Tokai Carbon K.K.)
(*3):2-mercaptobenzothiazole
(*4):tetramethylthiuram tetrasulfide
(*5):dipentamethylenethiuram tetrasulfide
(*6):tellurium diethyldithiocarbamate
(*7):p,p'-hydroxybis(benzenesulfonylhydradide)

What we claim is:

1. A free expandable rubbery composition comprising an ethylene/α-olefin copolymer or terpolymer, a blowing agent and a crosslinking agent, said ethylene/α-olefin co- or terpolymer simultaneously meeting the following requirements (A), (B) and (C):

(A) it contains 55 to 73 mole% of an ethylene unit, (B) it has an (EB×TS) value of at least 7,000 wherein EB represents the break elongation (%) of the co- or terpolymer and TS is the maximum tensile strength (kg/cm$^2$) of the co- or terpolymer, and (C) it has a Mooney viscosity, $ML_{1+4}$ at 121° C., of 65 to 120.

2. The composition of claim 1 wherein said ethylene/α-olefin co- or terploymer has an ethylene unit content of 60 to 70 mole%.

3. The composition of claim 1 wherein the ethylene/α-olefin co- or terpolymer has an (EB×TS) value of 10,000 to 100,000.

4. The composition of claim 1 wherein the ethylene/α-olefin co- or terpolymer has a maximum tensile strength (TS) of 5 to 60 kg/cm$^2$.

5. The composition of claim 1 wherein the ethylene/α-olefin co- or terpolymer has a break elongation of at least 1,000%.

6. The composition of claim 1 wherein the ethylene/α-olefin co- or terpolymer has a Mooney viscosity, $ML_{1+4}$, at 121° C., of 70 to 110.

7. The composition of claim 1 wherein the α-olefin is propylene.

8. The composition of claim 1 wherein the ethylene/α-olefin terpolymer is an ethylene/α-olefin/diolefin terpolymer.

9. The composition of claim 8 wherein the terpolymer has a diolefin unit content of at most 10 mole%.

10. The composition of claim 8 wherein the diolefin is ethylidene norbornene.

11. The composition of claim 1 wherein the copolymer or terpolymer is present in an amount of 20 to 65% by weight based on the weight of the composition.

12. The composition of claim 1 wherein the blowing agent is present in an amount of 0.5 to 50 parts by weight per 100 parts by weight of the co- or terpolymer.

13. The composition of claim 1 wherein the crosslinking agent is present in an amount of 0.1 to 15 parts by weight per 100 parts by weight of the co- or terpolymer.

14. The composition of claim 1 wherein the composition further comprises a softening agent and/or a filler.

15. Use of an ethylene/α-olefin co- or terpolymer for the production of a crosslinked and foamed rubbery article by the free expansion method, said co- or terpolymer simultaneously meeting the following requirements (A), (B) and (C):

(A) it contains 55 to 73 mole% of an ethylene unit.

(B) it has an (EB×TS) value of at least 7,000 wherein EB is the break elongation (%) of the co- or terpolymer, and TS is the maximum tensile strength (kg/cm$^2$) of the co- or terpolymer, and (C) it has a Mooney viscosity, $ML_{1+4}$ at 121° C., of 65 to 120.

16. A process for producing a crosslinked and foamed rubbery article which comprises allowing an ethylene/α-olefin co- or terpolymer to expand freely in the presence of a blowing agent and a crosslinking agent, said co- or terpolymer simultaneously meeting the following requirements (A), (B) and (C):

(A) it contains 55 to 73 mole% of an ethylene unit, (B) it has an (EB×TS) value of at least 7,000 wherein EB is the break elongation (%) of the co- or terpolymer, and TS is the maximum tensile strength (kg/cm$^2$) of the co- or terpolymer, and (C) it has a Mooney viscosity, $ML_{1+4}$ at 121° C., of 65 to 120.

* * * * *